Dec. 31, 1968  H. L. VERNATI  3,418,872

TRANSMISSION SHIFT AND THROTTLE INTERLOCK

Filed Oct. 19, 1966

Inventor
Homer L. Vernati
By Charles L. Schwab
Attorney

United States Patent Office 3,418,872
Patented Dec. 31, 1968

3,418,872
TRANSMISSION SHIFT AND THROTTLE
INTERLOCK
Homer L. Vernati, Beecher, Ill., assignor to Allis-Chalmers Manufacturing Company, Milwaukee, Wis.
Filed Oct. 19, 1966, Ser. No. 587,852
9 Claims. (Cl. 74—878)

ABSTRACT OF THE DISCLOSURE

A pivoted member 108 has a notch therein which receives the end of a transmission shift lever 82 so as to lock the lever when it is in neutral position and a throttle 12 is depressed. A lost motion resilient connection between the throttle and member permits the throttle to be operated when the lever is not in neutral. If the lever is then moved towards neutral position, its lower end slides on the member and finally is received in the notch to lock the lever in neutral.

---

Figures 1, 2:
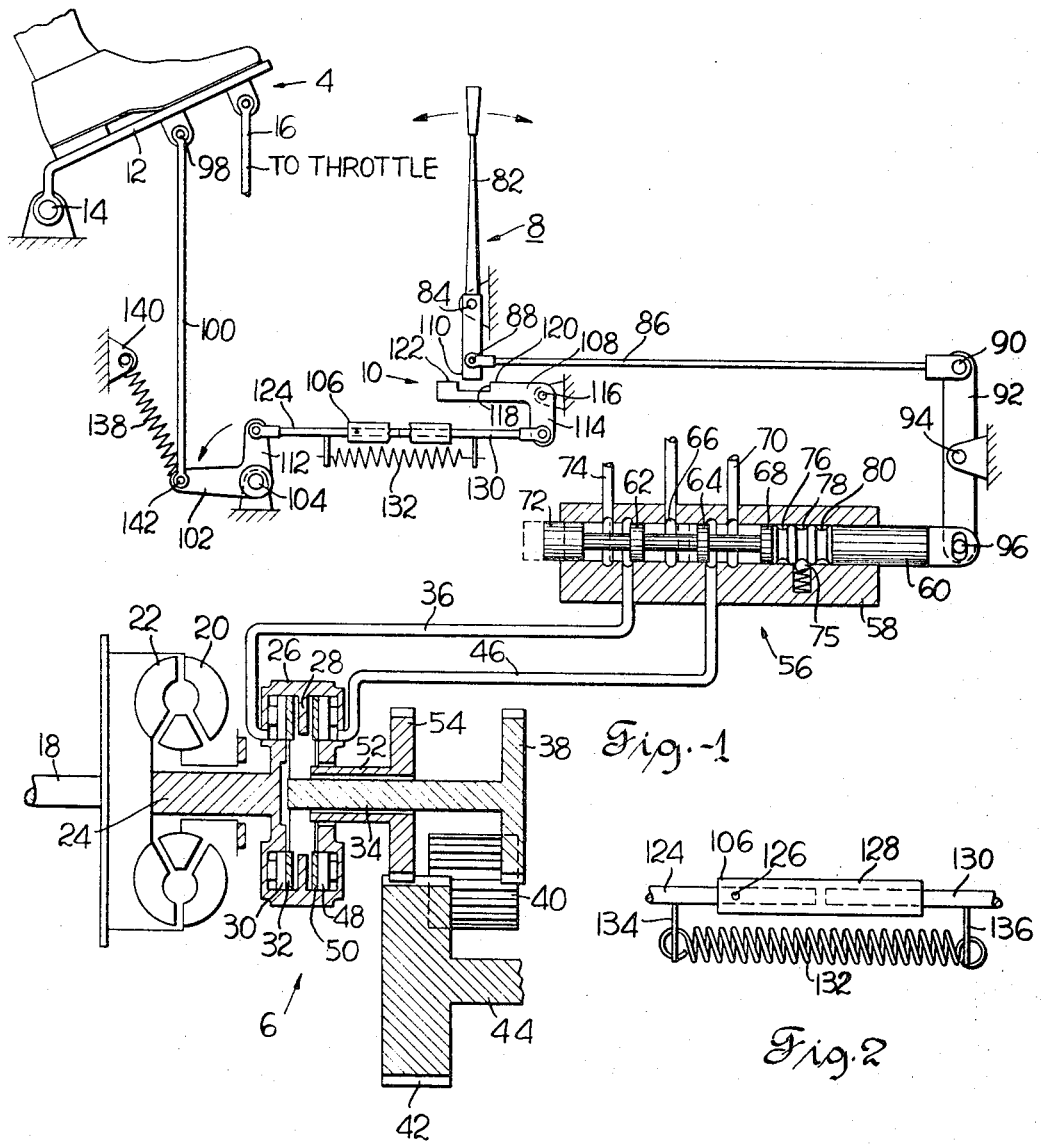

The present invention relates to variable speed transmissions and more particularly to safety interlock mechanism for such transmissions, and an object is to generally improve such interlock mechanism.

In the usual vehicle having forward-reverse transmission, damage to the transmission can occur if it is attempted to shift ratios in the transmission at a time when the prime mover is exerting substantial effort; and mechanism has been provided in the past which makes it impossible to shift the transmission at such times. The prime mover will nearly always have a speed or power control, and the interlock as presently known connects the speed control with the shift control in such a manner that the shift control cannot be operated except at such times as the speed control is in its lowest speed or idling position. Such interlocks have been generally satisfactory, but leave something to be desired, in that the operator may find his transmission locked in some ratio if something goes wrong with the speed control and thus be unable to stop the vehicle.

A principal object of this invention is to provide an interlock in which, not only is it impossible to shift the transmission into gear if the prime mover is above low idle, but that it *is* possible to shift the transmission into neutral or nondriving position regardless of the position of the prime mover speed control. Thus, it is always possible to stop the vehicle, no matter what may happen to the prime mover in such an emergency.

A further object is to provide such an interlock in which the position of the shift control will not interfere significantly with the operation of the speed control, and further objects and advantages will appear from the following description and accompanying drawings, in which:

FIG. 1 is a diagrammatic representation of a transmission with its control and a prime mover speed control including an interlock mechanism embodying the invention and interconnecting the controls; and FIG. 2 is an enlarged side elevation of certain mechanism indicated in FIG. 1 with the parts in a different position.

As seen in the drawings, the device includes a speed or power control 4, a transmission 6, and a shift control 8, the safety interlock mechanism being generally designated as 10.

Speed control 4 comprises a pedal 12 fulcrummed on a pivot 14 on the vehicle, or otherwise suitably supported, and having means including a link 16 pivoted thereto and extending to a prime mover which rotates a shaft 18 driving the pump portion 20 of a torque convertor having a turbine portion 22. Portion 22 is fixed on and rotates a shaft 24. Shaft 24 is fixed to an rotates a generally cylindrical clutch housing 26, which has therein an annular friction disk or plate 28. An annular piston 30 is pressed against a clutch plate 32 fixed on an output shaft 34 so that pressure fluid entering by a pipe 36 may push piston 30 toward the right as seen in the drawing, pressing clutch plate 32 against friction plate 28, thereby causing clutch plate 32 to rotate and drive shaft 34. Shaft 34 has a gear 38 engaged with an idler gear 40 which in turn engages a gear 42 on a final output shaft 44 which drives the vehicle running gear. With clutch plate 32 engaged as described, shaft 44 will be driven in the same direction as shaft 24.

It is to be understood that the drawing is diagrammatic and that well known means is utilized to get the pressure fluid from stationary pipes 36, 46 into rotating clutch housing 26.

Pressure fluid supplied through a pipe 46 moves a piston 48 toward the left, pressing a clutch plate 50 against the other side of friction plate 28. Clutch plate 50 is fixed on a sleeve 52 on which is fixed a gear 54 engaged with above mentioned gear 42. This will drive gear 42 and final output shaft 44 in the opposite direction to shaft 24, it being understood that either clutch must be disengaged when the other is engaged.

A spool valve 56 has a valve body 58 in which is reciprocable a spool 60 having spaced piston portions 62 and 64 between which in body 58 is an inlet port 66. Pressure fluid is supplied from any well known source to port 66 and the space between pistons 62 and 64. When spool 60 is shifted toward the left as seen in broken lines, fluid may pass from inlet port 66 through the space between pistons 62 and 64 into above mentioned pipe 36, whereas any fluid trapped in pipe 46 may discharge through the space between piston 64 and a closure portion 68 and escape through an exhaust pipe 70. If spool 60 is shifted toward the right, it will be apparent that fluid will be transmitted to pipe 46, while pipe 36 will be exhausted through the space between piston 62 and a closure portion 72 and escape through a pipe 74.

It is to be noted that, in the central position of the spool shown, pipe or port 66 is closed off from both pipes 36 and 46 and that pipes 36 and 46 are in communication with exhaust pipes 74 and 70, respectively, so that neither clutch plate 32 nor 50 is engaged with friction plate 28; and no motion is transmitted to output shaft 44. The transmission may, therefore, be said to be in a neutral or nondriving position.

A spring pressed detent 75 engages grooves 76, 78, and 80 to yieldingly maintain spool 60 in any one of its three positions.

Spool 60 is shifted by a hand lever 82 fulcrummed on a pivot 84 and having a link 86 connected thereto on a pivot 88. Link 86 is connected by a pivot 90 to a rocker lever 92 fulcrummed on a pivot 94 and connected to spool 60 by means of a connection 96.

It will now be apparent that shifting of hand lever 82 one way will engage transmission 6 for operation in one direction, while shifting lever 82 the other way will engage transmission 6 for operation in the other direction. Also, that shifting lever 82 to its mid-position will shift transmission 6 into its neutral or nondriving position.

Pedal 12 has a pivot 98 connecting a link 100 thereto, which extends transversely to pedal 12 and connects to a bellcrank 102 fulcrummed on a pivot 104 and connecting, through an extensible link 106, with a latch-ramp element 108. With pedal 12 in its "up" position, corresponding to minimum or idling speed of prime mover shaft 18, latch-ramp 108 is clear of a finger portion 110 on lever 82 so that lever 82 is free to be moved by hand to shift transmission 6.

Bell-crank 102 has an upwardly directed arm 112 connected with extensible link 106 and latch-ramp element 108 has a downwardly directed arm 114 connected with link 106 and is fulcrummed on a pivot 116 fixed on the vehicle so that downward movement of pedal 12 from low-speed position will cause upward movement of swinging of latch-ramp 108 so that a notch 118 will be lifted into engagement with finger 110 to prevent any movement of lever 82. Latch-ramp 108 has ramp surfaces 120 and 122 on either side of notch 118, presented to finger 110, one of which will engage the latter after shifting of lever 82 to place the transmission "in gear," when pedal 12 is depressed to speed up the prime mover. Pedal 12 may be depressed by virtue of yielding of link 106; but it will be noted that, even with pedal 12 depressed, lever 82 may still be shifted into neutral or nondriving position, finger 110 sliding on appropriate ramp surface 122 or 120 and being engaged by notch 118 as latch-ramp 108 swings up under the biasing effect of the impetus of the spring 132 on link 106.

Link 106 may be made in various ways within the contemplation of the invention, in the present instance comprising a rod 124 having fixed thereon as by a pin 126 a sleeve 128. Sleeve 128 receives therein in slidable relation a rod 130 which is yieldingly maintained in abutting contact with rod 124 within sleeve 128 as seen in FIG. 1 by the spring 132 engaged with a bracket 134 on rod 124 with a bracket 136 on rod 130. Link 106, may, therefore, act as a rigid structure in every respect except in tension, wherein it is expansible by sliding of sleeve 128 on rod 130 if the link is subjected to sufficient tension to overcome spring 132.

A spring 138 anchored on a bracket 140 is connected in the present embodimen to a pivot 142 on bell-crank 102 and serves to return pedal 12 to its minimum speed position when it is not depressed by the operator.

When no force is applied to pedal 12, it is maintained in its uppermost position by spring 138 and the prime mover is either stopped or running at a minimum or idling speed. Notch 118 is clear of finger 110, and lever 82 may be moved freely to engage transmission 6 for operation in either direction. Finger 110 will then be positioned over ramp 120 or ramp 122, depending upon which direction is chosen. If pedal 12 is now depressed to start or increase the speed of the prime mover by shifting link 16, latch-ramp 108 will be swung upwardly into contact with finger 110. Pedal 12 may be further depressed since, although rod 130 cannot move, sleeve 128 may slide along rod 130 by reason of movement of rod 124 through the action of link 100 and bell-crank 102 and which movement is permitted by yielding of spring 132. If for any reason it becomes desirable to shift transmission 6 while pedal 12 is still depressed, finger 110 slides along the ramp with which it is engaged until notch 118 registers with it, whereupon latch-ramp 108 swings upwardly so that notch 118 engages finger 110 and prevents any further movement of lever 82 until such time as pedal 12 is released and returned to idling position.

In utilizing the present invention, the prime mover speed control pedal may be depressed at tny time to accelerate the prime mover, that transmission 6 cannot be shifted into gear while pedal 12 is so depressed, but that transmission 6 may be shifted out of gear at any time, whether or not pedal 12 is depressed and the interlock mechanism prevents shifting from one speed to another, including forward-reverse shifting, while pedal 12 is depressed.

It is to be understood that variations in the specific application of the invention are contemplated and that all such as come within the scope of the following claims are intended to be covered.

What is claimed is:

1. A transmission interlock for use with a prime mover of the variable speed type and a shiftable transmission having a nondriving position, including a prime mover speed control connected for varying the speed of said prime mover, a manually operable shift control connected for shifting said shiftable transmission, a finger element connected to one of said controls, a latch-ramp element connected to the other control having a notch engageable with said finger element to prevent movement of said shift control, a ramp portion on said latch-ramp element at one side of said notch positioned to slidably engage said finger element when said shift control is in driving position and said speed control is moved in a speed increasing direction, yieldable means in the connection between one of said elements and its associated control whereby said finger element will lockingly engage said notch and thereby prevent movement of said shift control when said speed control is moved from its low-speed position to an increased speed position and said shift control is in its neutral position, said transmission being shiftable out of said nondriving position by movement of said shift control from its neutral position at any time that said prime mover is running at a minimum speed and said transmission being shiftable into said nondriving position whether or not said prime mover is running at more than a minimum speed.

2. A transmission control interlock having all the characteristics of claim 1 in which said finger element is on said shift control and said latch-ramp element is movable through said yieldable means by reason of movement of said speed control in a direction to engage said latch-ramp element with said finger element.

3. A transmission control interlock having all the characteristics of claim 2 in which said latch-ramp element is swingable in a direction to engage said finger element.

4. A transmission interlock having all the characteristics of claim 1 in which said yieldable means comprises a variable length link.

5. A transmission interlock having all the characteristics of claim 4 in which said variable length link is expansible in tension.

6. A transmission interlock having all the characteristics of claim 5 in which said variable length link is composed of relatively slidable sections, and includes abutment means preventing sliding in a direction to define a minimum length of said link, and a spring connection in tension to said sections in position to yieldingly maintain said slidable sections in the position defined by said abutment means.

7. A transmssion interlock having all the characteristics of claim 6 in which one of said sections comprises a sleeve within which another section is slidable.

8. A transmission interlock having all the characteristics of claim 1 in which said transmission includes a fluid pressure actuated clutch connected for shifting said transmission into and out of said nondriving position and a valve connected with said clutch in relation to control the flow of pressure fluid to said clutch for shifting said transmission, and means connected with said manually operable shift control and with said valve for actuating the latter in response to movement of said shift control.

9. A transmission interlock having all the characteristics of claim 1 in which said transmission has forward and reverse driving positions and wherein said elements cooperate to prevent said shift control from being moved from forward to reverse and vice versa when said speed control is out of its low-speed poistion.

References Cited

UNITED STATES PATENTS

| | | | |
|---|---|---|---|
| 2,493,592 | 1/1950 | Peabody | 74—878 |
| 2,512,853 | 6/1950 | Eaton | 192—.092 |
| 2,519,080 | 8/1950 | Simpson | 192—.096 X |
| 3,228,504 | 1/1966 | Funk | 192—.098 |

BENJAMIN W. WYCHE, III, *Primary Examiner.*

U.S. Cl. X.R.

192—7, 98